United States Patent

Nakajima et al.

[11] Patent Number: 5,836,427
[45] Date of Patent: Nov. 17, 1998

[54] MOUNTING CONSTRUCTION OF DISC BRAKE ASSEMBLY

[75] Inventors: Tatsuyuki Nakajima; Toshitaka Suga, both of Nagoya, Japan

[73] Assignee: Aisin Seiki Kabushiki Kaisha, Kariya, Japan

[21] Appl. No.: 806,677

[22] Filed: Feb. 26, 1997

[30] Foreign Application Priority Data

Feb. 27, 1996 [JP] Japan .................................. 8-040057

[51] Int. Cl.⁶ .............................. F16D 65/14; F16F 2/00
[52] U.S. Cl. ..................... 188/73.46; 188/73.34; 188/73.39; 267/141.1; 267/140.4; 411/544
[58] Field of Search ................. 188/73.1, 73.35, 188/73.37, 73.39, 73.46, 73.47; 267/205 A, 264 G, 140.4, 141.1, 141.4, 141.7, 152, 153; 403/225, 291; 411/542, 544, 902, 903; 277/164, 165

[56] References Cited

U.S. PATENT DOCUMENTS

| | | | |
|---|---|---|---|
| 3,350,042 | 10/1967 | Stewart et al. | 267/141.4 |
| 3,532,319 | 10/1970 | Brown | 267/141.4 |
| 3,684,271 | 8/1972 | Arthur | 267/152 |
| 4,067,184 | 1/1978 | Johnson, IV | 57/135 |
| 4,333,222 | 6/1982 | Melin . | |
| 4,449,329 | 5/1984 | Sauerwein et al. | 51/168 |
| 4,667,628 | 5/1987 | Lopez-Crevillen . | |
| 4,691,810 | 9/1987 | Matsuzaki | 188/73.1 |
| 5,099,962 | 3/1992 | Furusu et al. | 188/73.37 |
| 5,407,034 | 4/1995 | Vydva et al. | 188/73.37 |
| 5,489,180 | 2/1996 | Ichihara et al. | 411/544 |

FOREIGN PATENT DOCUMENTS

| | | |
|---|---|---|
| 0 218 033 | 4/1987 | European Pat. Off. . |
| 0 339 364 | 11/1989 | European Pat. Off. . |
| 5-272563 | 10/1993 | Japan . |
| 5-71811 | 10/1993 | Japan . |
| 7-259901 | 10/1995 | Japan . |
| 2 184 187 | 6/1987 | United Kingdom . |
| 2 264 474 | 9/1993 | United Kingdom . |

OTHER PUBLICATIONS

Tatsuyuki Nakajima et al., "Study on Reduction Method of Brake Squeal", SAE Convention, Oct. 14, 1996, pp. 1–5.

*Primary Examiner*—Robert J. Oberleitner
*Assistant Examiner*—Chris Schwartz
*Attorney, Agent, or Firm*—Burns, Doane, Swecker & Mathis, LLP

[57] ABSTRACT

A disc brake assembly that includes a mounting bracket formed with an attachment face for engagement with the corresponding attachment face of a stationary support bracket and fixed to the stationary support bracket by way of a fastening bolt, is provided with a damping element to reduce brake squeal caused by compound vibration acting on the mounting bracket during braking operation. The damping element is positioned between the attachment faces of the mounting bracket and the stationary support bracket. The damping element can take various forms including a metallic washer covered on opposite faces with rubber members, or an annular rubber element having metallic washers adhered to its opposite faces. The damping element can also be in the form of a shim plate in which rubber plates are secured to opposite faces, or a pair of shim plates secured to opposite faces of a rubber plate.

20 Claims, 4 Drawing Sheets

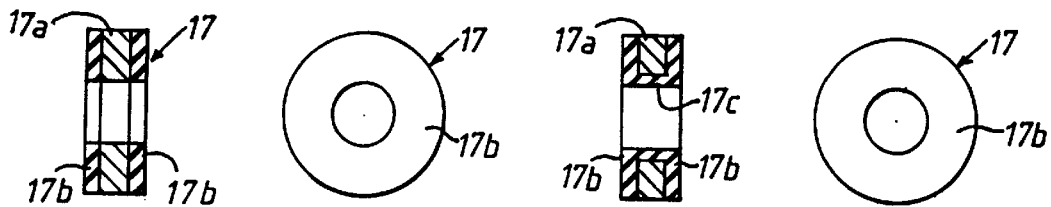
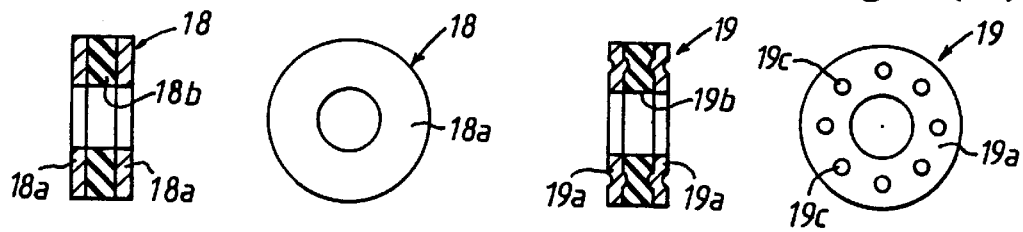
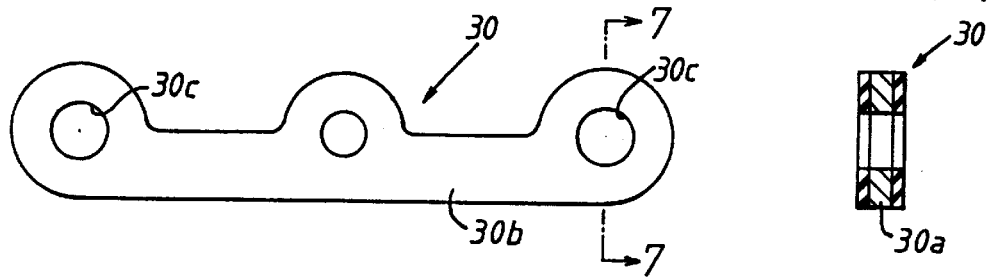
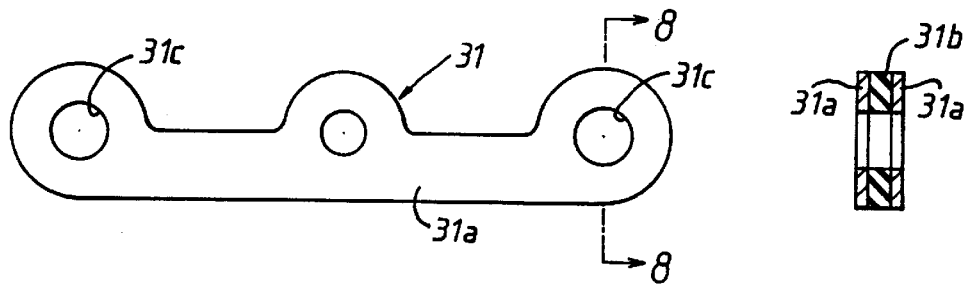

5,836,427

MOUNTING CONSTRUCTION OF DISC BRAKE ASSEMBLY

BACKGROUND THE INVENTION

1. Field of the Invention

The present invention relates to amounting construction of a disc brake assembly in automotive vehicles, and more particularly to a mounting construction of a disc brake assembly for reduction of high frequency squeal noise in braking operation.

2. Description of the Prior Art

In general, a conventional disc brake assembly adapted for use in automotive vehicles includes a mounting bracket which receives braking torque acting on a pair of friction pads supported thereon. The mounting bracket is formed with an attachment face for engagement with the corresponding attachment face of a stationary support bracket of a hub carrier or knuckle. The mounting bracket is coupled at its attachment face with the attachment face of the support bracket and fixed to the stationary support bracket by means of a fastening bolt.

Disclosed in Japanese Patent Publication No. 5(1993)-71811 is a mounting construction of a disc brake assembly the mounting bracket of which is bolted to a stationary support bracket through a shim plate of stainless steel to adjust the relative position to the stationary support structure and to prevent corrosion of the bolted portion.

In analysis of "brake squeal" in operation of the disc brake assembly, it has been found that there occur a low frequency squeal phenomenon and a high frequency squeal phenomenon. For reduction of the high frequency squeal, a shim plate covered with rubber is disposed between the friction pad and the piston in the hydraulic cylinder of the disc brake assembly. For reduction of the low frequency squeal, there has been proposed a disc brake assembly in Japanese Patent Laid-open Publication No. 7(1995)-259901, wherein the mounting bracket of the disc brake assembly is reinforced in stiffness without any addition of weight. However, the reinforcement of stiffness of the mounting bracket is insufficient to reduce the high frequency squeal.

SUMMARY OF THE INVENTION

It is, therefore, a primary object of the present invention to provide a mounting construction of a disc brake assembly capable of effectively reducing the high frequency squeal caused by compound vibration acting on the mounting bracket without any addition of weight.

According to the present invention, the object is accomplished by providing a mounting construction of a disc brake assembly the mounting bracket of which is formed with an attachment face for engagement with the corresponding attachment face of a stationary support bracket and fixed to the stationary support bracket by means of a fastening bolt, wherein a damping element is disposed between the attachment faces of the mounting bracket and the stationary support bracket to reduce a brake squeal caused by compound vibration acting on the mounting bracket in braking operation.

In practical embodiments of the present invention, it is preferable that the damping element is composed of a metallic washer covered at its opposite faces with a pair of annular rubber members secured thereto. Alternatively, the damping element may be composed of a pair of metallic washers adhered to opposite faces of an annular rubber member. The damping element may be also composed of a shim plate formed in a configuration corresponding with the attachment face of the mounting bracket and a pair of rubber plates adhered to opposite faces of the shim plate.

BRIEF DESCRIPTION OF THE DRAWINGS

Other objects, features and advantages of the presents invention will be more readily appreciated from the following detailed description of preferred embodiments thereof when taken together with the accompanying drawings, in which:

FIG. 3(A) is a sectional view of a damping element disposed between a mounting bracket of the disc brake assembly and a stationary support bracket;

FIG. 3(B) is a front view of the damping element shown in FIG. 3(A);

FIG. 4(A) is a sectional view of a first modification of the damping element shown in FIGS. 3(A) and 3(B);

FIG. 4(B) is a front view of the damping element shown in FIG. 4(A);

FIG. 5(A) is a sectional view of a second modification of the damping element shown in FIGS. 3(A) and 3(B);

FIG. 5(B) is a front view of the damping element shown in FIG. 5(A);

FIG. 6(A) is a sectional view of a third modification of the damping element shown in FIGS. 3(A) and 3(B);

FIG. 6(B) is a front view of the damping element shown in FIG. 6(A);

FIG. 7(A) is a front view of a fourth modification of the damping element shown in FIGS. 3(A) and 3(B);

FIG. 7(B) is a sectional view of the damping element taken along line 7—7 in FIG. 7(A);

FIG. 8(A) is a front view of a fifth modification of the damping element shown in FIGS. 3(A) and 3(B);

FIG. 8(B) is a sectional view of the damping element taken along line 8—8 in FIG. 8(A);

DESCRIPTION OF THE PREFERRED EMBODIMENTS

Figure 1:
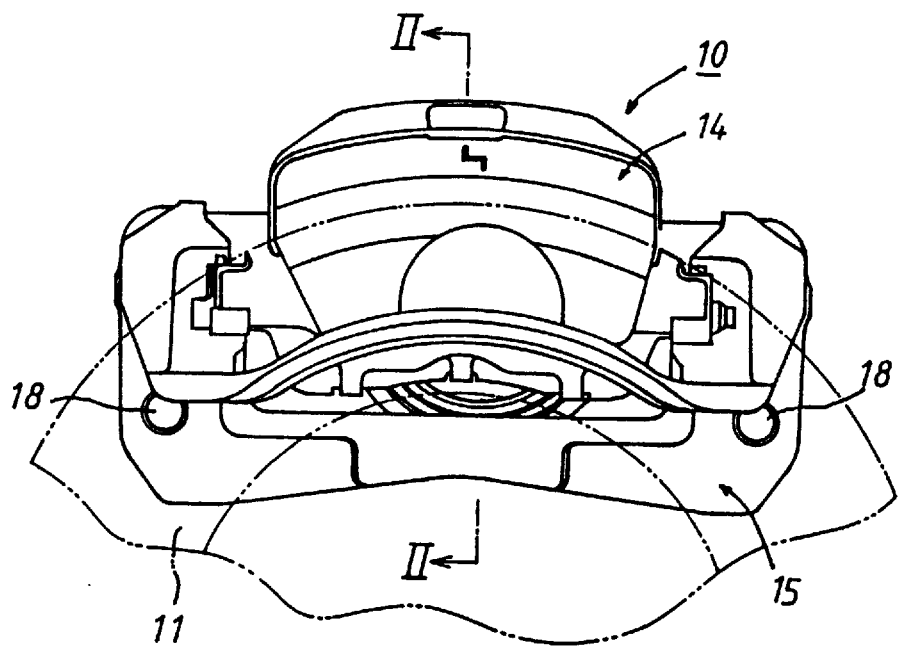
FIG. 1 is a front view of a disc brake assembly.
Figure 2:
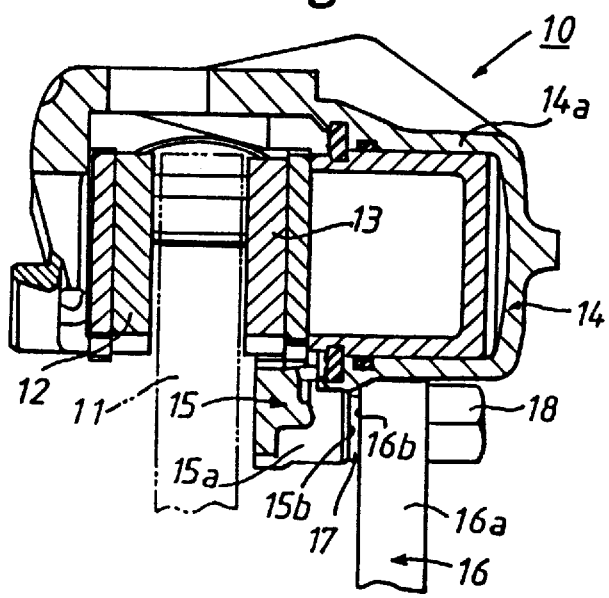
FIG. 2 is a sectional view taken along line II—II in FIG. 1.

In FIGS. 1 and 2 of the drawings, there is illustrated a disc brake assembly 10 of the sliding caliper type mounted on a stationary support bracket 16 of a hub carrier or knuckle.

The disc brake assembly 10 includes a disc rotor 11 secured for rotation with a road wheel of an automotive vehicle, a caliper member 14 axially slidably mounted on a mounting bracket 15, a pair of friction pads 12 and 13 carried by the caliper member 14 at the opposite sides of the disc rotor 11, a cup-shaped piston disposed within a cylinder portion 14a of the caliper member 14 to press the inner friction pad 13 into contact with one face of the disc rotor 11 so that the outer friction pad 12 is pressed into contact with the other face of the disc rotor 11. The mounting bracket 15 is provided with a pair of laterally spaced leg portions 15a, 15a, while the stationary support bracket 16 is provided with a pair of leg portions 16a, 16a which correspond with the leg portions 15a, 15a of the mounting bracket 15. The leg portions 15a, 15a of mounting bracket 15 each are formed with an attachment face 15b for engagement with each attachment face 16b formed on the leg portions 16a, 16a of stationary support bracket 16.

In the mounting construction of the disc brake assembly 10, the mounting bracket 15 is coupled with the support bracket 16 at their leg portions 15a, 16a through a pair of damping elements 17, 17 and fixed to the support bracket 16 by means of a pair of fastening bolts 18. As shown in FIGS. 3(A) and 3(B), the damping elements 17 each are in the form of a metallic washer 17a covered at its opposite faces with a pair of annular rubber members 17a, 17a secured thereto. The fastening bolts 18 are threaded into the leg portions 15a, 15a through the leg portions 16a, 16a of support bracket 16 and the damping elements 17, 17.

Figure 12A:
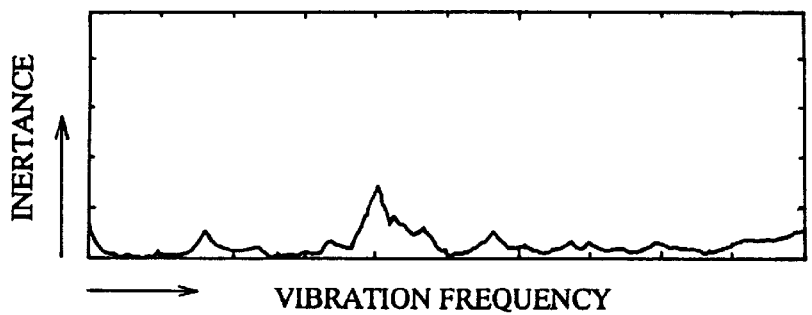
FIG. 12(A) is a graph showing a frequency response function of vibration in the disc brake assembly illustrated in FIGS. 1 and 2.
Figure 12B:
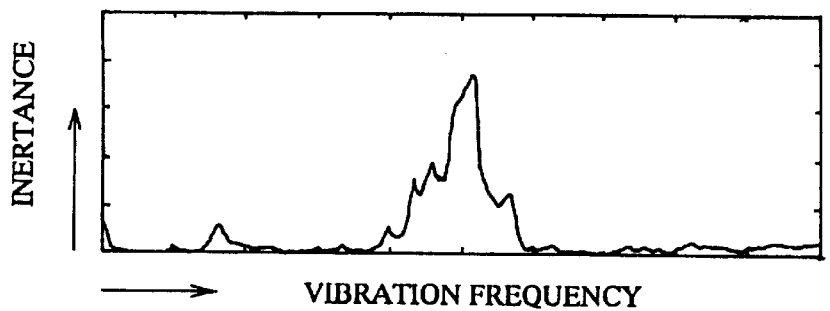
FIG. 12(B) is a graph showing a frequency response function of vibration in a conventional disc brake assembly.
Figure 13:
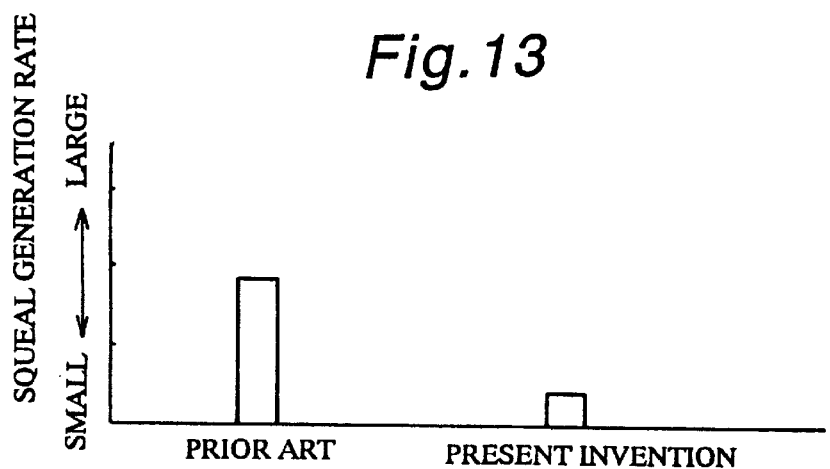
FIG. 13 is a graph showing a high frequency squeal generation rate in the disc brake assembly in comparison with that in the conventional disc brake assembly.

With the mounting construction described above, it has been found that as shown by a frequency response function respectively in FIGS. 12(A) and 12(B), the damping elements 17 are effective to noticeably drop a peak value of vibration response waveform in the disc brake assembly 10 in comparison with vibration response waveform in a conventional disc brake assembly the mounting bracket of which is fixed to the stationary support bracket without using any damping element. In the frequency response function shown in FIGS. 12(A) and 12(B), an inertance is represented in relation to a vibration frequency. Illustrated in FIG. 13 is the fact that the high frequency squeal generation rater in the disc brake assembly 10 is noticeably reduced in comparison with that in the conventional disc brake assembly.

In practical embodiments of the present invention, the damping element 17 may be modified as shown in FIGS. 4(A) and 4(B), wherein the inner periphery of metallic washer 17a is covered with a cylindrical portion 17c integrally formed with one of the annular rubber members 17b to enhance the damping effect at the coupled portion. The damping element 17 may be replaced with a damping element 18 shown in FIGS. 5(A) and 5(B), wherein the damping element 18 is composed of a pair of metallic washers 18a, 18a adhered to opposite faces of an annular rubber member 18b. Alternatively, the damping element 17 may be replaced with a damping element 19 shown in FIGS. 6(A) and 6(B), wherein the damping element 19 is composed of a pair of metallic washers 19a, 19a adhered to opposite faces of an annular rubber member 19b and pressed at their circumferentially equally spaced portions 19c to enhance the damping effect at the coupled portion in a compressing direction and a shearing direction of rubber member 19b.

In a modification of the mounting construction of the disc brake assembly 10 shown in FIGS. 1 and 2, the pair of damping elements 17, 17 may be replaced with a single damping element 30 as shown in FIGS. 7(A) and 7(B). In this modification, the single damping element 30 is formed in a configuration corresponding with the attachment face of the mounting bracket 15 and is composed of a shim plate 30a covered at its opposite faces with a pair of rubber plates 30b adhered thereto and formed with a pair of laterally spaced mounting holes 30c, 30c through which the bolts 18 are threaded into the mounting bracket 15. Alternatively, the pair of damping elements 17, 17 may be replaced with a single damping element 31 as shown in FIGS. 8(A) and 8(B). The single damping element 31 is formed in a configuration corresponding with the attachment face of the mounting bracket 15 and is composed of a pair of shim plates 31a, 31a adhered to opposite faces of a rubber plate 31b and formed with a pair of laterally spaced mounting holes 31c, 31c through which the bolts 18 are threaded into the mounting bracket 15.

Figure 9:
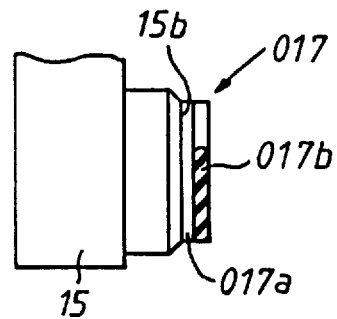
FIG. 9 is a side view of another embodiment of the present invention.

Illustrated in FIG. 9 is another modification of the mounting construction of the disc brake assembly 10, wherein the damping element 17 is replaced with a damping element 017 which is in the form of a metallic washer 017a covered at its one surface with an annular rubber member 017b adhered thereto. In this modification, the metallic washer 017a is adhered at its opposite surface to the attachment face 15b of mounting bracket 15 so that the annular rubber member 017b is engaged with the attachment face 16b of stationary support bracket 16 to reduce the high frequency squeal.

Figure 10A:
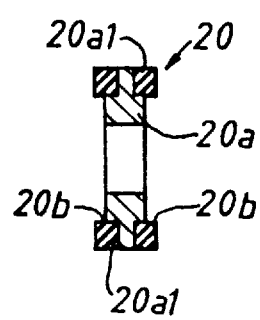
FIG. 10(A) is a sectional view of a sixth modification of the damping element shown in FIGS. 3(A) and 3(B)
Figure 10B:
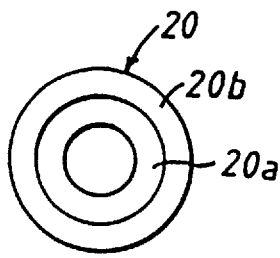
FIG. 10(B) is a front view of the damping element shown in FIG. 10(A)

Furthermore, the damping element 17 in the disc brake assembly 10 may be also replaced with a damping element 20 shown in FIGS. 10(A) and 10(B), wherein the damping element 20 is composed of a metallic washer 20a formed at its opposite faces with a pair of annular recesses 20a1, 20a1 and a pair of annular rubber members 20b, 20b fixedly coupled within the annular recesses 20a1, 20a1 of washer 20a. In this case, each rubber member 20b is formed larger in thickness than the depth of each annular recess 20a1. Thus, the annular rubber members 20b, 20b are protruded from the opposite surfaces of metallic washer 20a in a free condition to be deformed by engagement with the attachment face 16b of the support structure 16 when applied with fastening torque of the bolt 18.

Figure 11A:
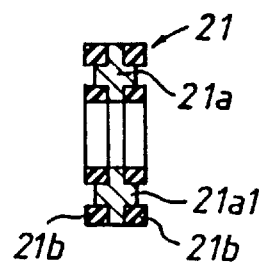
FIG. 11(A) Is a sectional view of a seventh modification of the damping element shown in FIGS. 3(A) and 3(B)
Figure 11B:
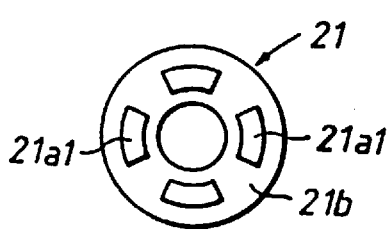
FIG. 11(B) is a front view of the damping element shown in FIG. 11(A)

The damping element 17 in the disc brake assembly 10 may be further replaced with a damping element 21 shown in FIGS. 11(A) and 11(B), wherein the damping element 21 is composed of a metallic washer 21a formed with a plurality of circumferentially equally spaced projections 21a1 respectively at its opposite faces and a pair of annular rubber members 21b secured to the opposite faces of metallic washer 21a in such a manner that each rubber member 21b is protruded from the projections 21a1 of washer 21a in a free condition to be deformed by engagement with the attachment face 16b of the support structure 16 when applied with fastening torque of the bolt 18.

What is claimed is:

1. A mounting construction of a disc brake assembly in which the disc brake assembly includes a mounting bracket formed with an attachment face which faces a corresponding attachment face of a stationary support bracket and fixed to the stationary support bracket by way of a fastening bolt, the mounting construction comprising a damping element disposed between the attachment faces of said mounting bracket and said stationary support bracket to reduce brake squeal caused by compound vibration acting on said mounting bracket.

2. A disc brake assembly as recited in claim 1, wherein said damping element is composed of a metallic washer having opposite faces to which are secured a pair of annular rubber members.

3. A mounting construction of a disc brake assembly as recited in claim 2, wherein an inner periphery of said metallic washer is covered with a cylindrical portion integrally formed with one of the annular rubber members.

4. A mounting construction of a disc brake assembly as recited in claim 1, wherein said damping element is composed of a pair of metallic washers adhered to opposite faces of an annular rubber member.

5. A mounting construction of a disc brake assembly as recited in claim 4, wherein said metallic washers are pressed axially inwardly at a plurality of circumferentially equally spaced portions.

6. A mounting construction of a disc brake assembly as recited in claim 1, wherein said damping element is composed of a shim plate formed in a configuration corresponding with the attachment face of said mounting bracket and a pair of rubber plates adhered to opposite faces of said shim plate.

7. A mounting construction of a disc brake assembly as recited in claim 1, wherein said damping element is composed of a pair of shim plates formed in a configuration corresponding with the attachment face of said mounting bracket and adhered to opposite faces of a rubber plate.

8. A mounting construction of a disc brake assembly as recited in claim 1, wherein said damping element is composed of a metallic washer having one surface covered with an annular rubber member adhered to the one surface and an opposite surface adhered to the attachment face of said mounting bracket.

9. A mounting construction of a disc brake assembly as recited in claim 1, wherein said damping element is composed of a metallic washer formed at its opposite faces with a pair of annular recesses and a pair of annular rubber members fixedly coupled within the annular recesses of said washer, said rubber members each being formed larger in thickness than each depth of said annular recesses.

10. A mounting construction of a disc brake assembly as recited in claim 1, wherein said damping element is composed of an annular metallic washer having axially facing opposite faces at which are formed a plurality of axially extending and circumferentially equally spaced projections and a pair of annular rubber members secured to the opposite faces of said metallic washer in such a manner that each rubber member protrudes from the projections of said washer in a free condition.

11. A disc brake assembly comprising:
a mounting bracket having an attachment face and a stationary support bracket having an attachment face, the attachment face of the mounting bracket facing the attachment face of the supporting bracket, the mounting bracket being connected to the supporting bracket by a fastening device; and
a damping element positioned between the attachment face of the mounting bracket and the attachment face of the supporting bracket for reducing brake squeal caused by compound vibration acting on the mounting bracket, the fastening device passing through the damping element, and the damping element being comprised of two different materials.

12. A disc brake assembly as recited in claim 11, wherein the two different materials comprising said damping element include a metallic washer having opposite faces each covered with an annular rubber member.

13. A disc brake assembly as recited in claim 12, wherein the metallic washer includes an inner periphery that is covered with a cylindrical portion integrally formed with one of the annular rubber members.

14. A disc brake assembly as recited in claim 11, wherein the two different materials comprising said damping element include an annular rubber member having opposite faces and a metallic washer adhered to each of the opposite faces of the annular rubber member.

15. A disc brake assembly as recited in claim 14, wherein each metallic washer is pressed axially inwardly at a plurality of circumferentially equally spaced portions.

16. A disc brake assembly as recited in claim 11, wherein the two different materials comprising said damping element include a shim plate formed in a configuration corresponding with the attachment face of said mounting bracket and a pair of rubber plates adhered to opposite faces of said shim plate.

17. A disc brake assembly as recited in claim 11, wherein the two different materials comprising said damping element include a pair of shim plates formed in a configuration corresponding with the attachment face of said mounting bracket and adhered to opposite faces of a rubber plate.

18. A disc brake assembly as recited in claim 11, wherein the two different materials comprising said damping element include a metallic washer having one surface to which is adhered an annular rubber member and an opposite surface adhered to the attachment face of said mounting bracket.

19. A disc brake assembly as recited in claim 11, wherein the two different materials comprising said damping element include a metallic washer having opposite faces each provided with an annular recess and an annular rubber member fixedly secured within each annular recess of said washer, each annular recess having a depth and each rubber member being formed larger in thickness than the depth of the annular recess.

20. A disc brake assembly as recited in claim 11, wherein the two different materials comprising said damping element include an annular metallic washer having axially facing opposite faces each formed with a plurality of axially extending and circumferentially equally spaced projections and a pair of annular rubber members secured to the opposite faces of said metallic washer in such a manner that each rubber member protrudes from the projections of said washer in a free condition.

* * * * *